United States Patent [19]

Niederhauser et al.

[11] 4,023,910
[45] May 17, 1977

[54] ELECTRONIC PHOTOMETER WITH TWO VARIABLE INDICATORS

[75] Inventors: Marc Niederhauser, Boudry; Pierre Huguenot, Yverdon, both of Switzerland

[73] Assignee: Bolex International SA, Ste-Croix, Switzerland

[22] Filed: Dec. 11, 1975

[21] Appl. No.: 531,661

[30] Foreign Application Priority Data

Dec. 11, 1973   Switzerland ............... 17414/73

[52] U.S. Cl. .................... 356/227; 356/230; 354/60 L

[51] Int. Cl.² .................................... G01J 1/42

[58] Field of Search .......... 356/227, 230, 227, 222, 356/224; 324/96, 132; 354/53, 60 L

[56] References Cited

UNITED STATES PATENTS

| | | | |
|---|---|---|---|
| 3,436,158 | 4/1969 | Schmitt | 356/227 |
| 3,516,750 | 6/1970 | Schmitt | 356/227 |
| 3,529,897 | 9/1970 | Pfaffenberger | 356/227 |
| 3,597,095 | 8/1971 | Fukushima | 356/227 |
| 3,638,114 | 1/1972 | Finley | 324/132 |

*Primary Examiner*—John K. Corbin
*Assistant Examiner*—Conrad Clark
*Attorney, Agent, or Firm*—Fleit & Jacobson

[57] ABSTRACT

There is disclosed an evaluating circuit for use with a photoelectric transducer and an electronic photometer. The photometer comprises indicators, all of which are variable, and comprises a combining device arranged to combine by an inverse computing operation.

11 Claims, 3 Drawing Figures

ELECTRONIC PHOTOMETER WITH TWO VARIABLE INDICATORS

BACKGROUND OF THE INVENTION

The invention relates to an electronic photometer with a photoelectric transducer in an evaluating circuit, at the output of which circuit there is connected at least one of two luminescent indicators, the brightnesses of which indicators can be matched for determination of the scene brightness, by setting an adjustment device to vary the value of a parameter of illumination.

Light meters of this kind generally present two lamps, one of which has a constant brightness, thereby delivering a reference brightness. The other lamp on the contrary is variable in its luminous power, being supplied from the output of the evaluating circuit so that upon adjustment of a parameter of illumination by the grey wedge or shutter connected in series with the photoelectric transducer, or by changing the resistance within the evaluating circuit, the brightness of said second lamp is varied. What is involved here is a subjective light measurement, because the eye of the observer has to determine the match of the two brightnesses. Obviously methods of photometry of this kind are weighted with error. However, they afford the user a greater freedom in selection of his parameters of illumination than a fully automatic control would allow.

The present invention is addressed to the problem of producing a photometer of the mentioned type, in which the advantages of known light meters are retained, but which allows greater accuracy in spite of subjective assessment of the brightness. This is effected in terms of the invention in that there is a first combining device (14; 47, 48, 49, 55) and a second combining device connected in a series with respective indicators (54) to each combining device the output signal (U2) of the evaluating circuit (2-12; 21-39) can be applied on the one hand, and on the other hand a reference signal (U4; 56), and in that one combining device (14; 55) is arranged to combine both signals by means of a computing operation, and the other combining device (16, 17; 40, 41, 55) is arranged to combine by an inverse computing operation, whereby the brightnesses of the two indicators are inversely changeable. The essence of the invention resides therefore in the fact that instead of a reference lamp with constant brightness, both indicators are variable, presenting the same brightness when correctly set. Hereby also the difference between the two brightnesses is substantially greater, and the adjustment point at which the brightnesses are equal is more readily determined. The combination can be effected by both addition and subtraction, as well as by multiplication and division etc. Preferably, each indicator presents a luminescent diode because there is then the additional advantage that the diode acts as a light emitter and also functions as a rectifier that blocks when there is too little or too much illumination, so that the diode is extinguished.

Another means of increasing the accuracy may be such that there is associated with the evaluating circuit a device controlling at least one indicator, for delinearizing the light characteristic of said indicator, to enhance the indicating sensitivity in the brightness match range of the two indicators. This measure can also be used independently of the light meters that have been mentioned, i.e., also with a photometer in which an indicator is lit at constant brightness. Precisely in the range in which the brightness difference is most poorly judged subjectively, the sensitivity is increased.

Other features of the invention are evident from the following description of examples shown schematically in the drawing. FIG. 1 is a block diagram of a photometer of the invention, whereof FIG. 2 shows details. FIG. 3 illustrates the special characteristics produces, where the brightness of the diode in shutter stages is plotted on the x axis, and the current through the diodes on the y axis.

DETAILED DESCRIPTION OF THE PREFERRED EMBODIMENT

Figure 1:
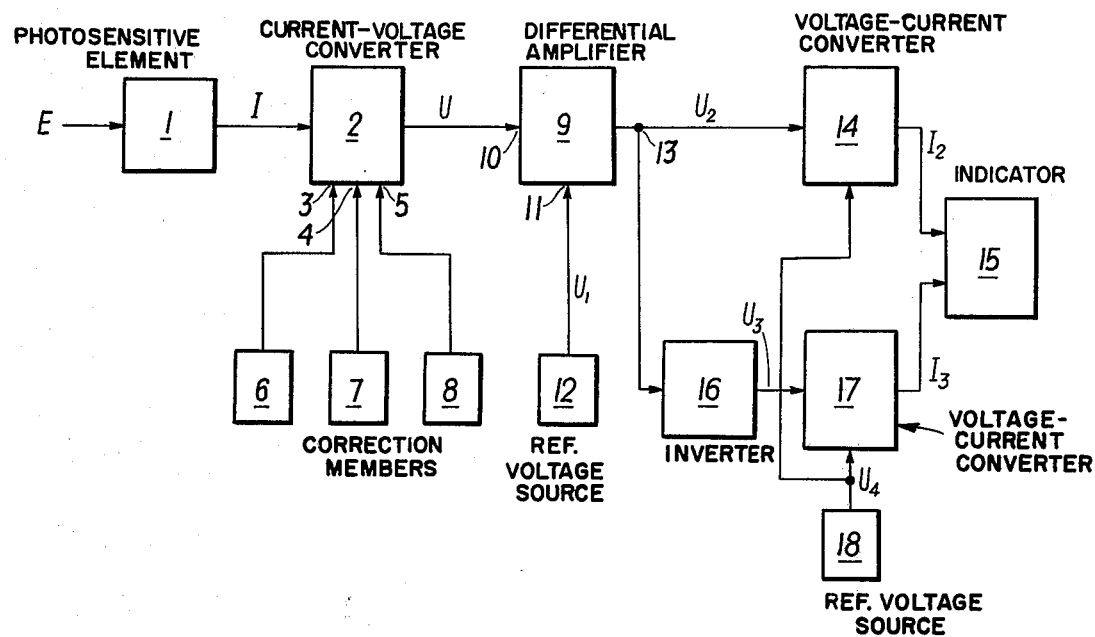

In FIG. 1, numeral 1 designates a photosensitive element constituted by a silicon diode. On this element a beam of light E is directed, corresponding to the illumination of the object that is to be filmed or photographed. This element, driven in short circuit, transmits current $I = s.E.$, where $s$ is the sensitivity of the photosensitive element, to a current-voltage converter 2. The output voltage of this converter is $U = k.1$, where $k$ is the conversion factor.

Conversion factor $k$ can be varied by means of three correction inputs, schematically represented and designated 3, 4 and 5. These are connected with corresponding correction members 6, 7 and 8. Correction member 6 effects a change of correction factor $k$ as a function of film sensitivity S. Correction member 7 serves to act on correction factor $k$ as a function of image change number V if the photometer is used in a movie camera. If the photometer is used in a photographic camera, i.e. one used only for still pictures, this correction member is eliminated, but it can be replaced by a correction member that is associated with the setting device of duration of exposure. Correction member 8 serves to change correction factor $k$ as a function of sensitivity $s$ of the light sensitive element. The circuit unit 9 following converter 2 has two inputs. The above mentioned voltage U is applied to one input, 10, and a voltage $U_1$ is applied to the other, 11, said voltage $U_1$ being taken from a reference voltage generator 12. Circuit 9 compares the two voltages and subtracts them, with simultaneous amplification to a result $U_2 = k_1 (U-U_1)$ or $U_2 = k'_1 (U_1-U)$, depending upon the sign of the difference $U - U_1$, where $k'_1 = \frac{1}{2} k_1$. The output of circuit 9 is connected to the input of a voltage-current converter 14, which delivers a current that is in proportion to voltage $U_2$ according to the equation $I_2 = f(U_2)$. This current $I_2$ is taken directly to an indicator 15.

The output of circuit 9 is also connected to an inverter 16. This inverter forms a voltage $U_3 = -U_2$, from voltage $U_2$. A circuit 17 is connected with the inverter, which like circuit 14 is a voltage-current converter, and is also connected to indicator 15. Circuit 17 applies a current $I_3$ to the indicator, said current $I_3$ being associated with voltage $U_3$ by the equation $I_3 = f(U_3)$. Still another reference voltage $U_4$ is applied to circuits 14 and 17, said reference voltage deriving from a source 18 whereby clues can be obtained concerning the quantitative error of illumination as opposed to the correct illumination that corresponds to the balanced state of the circuit.

Figure 2:
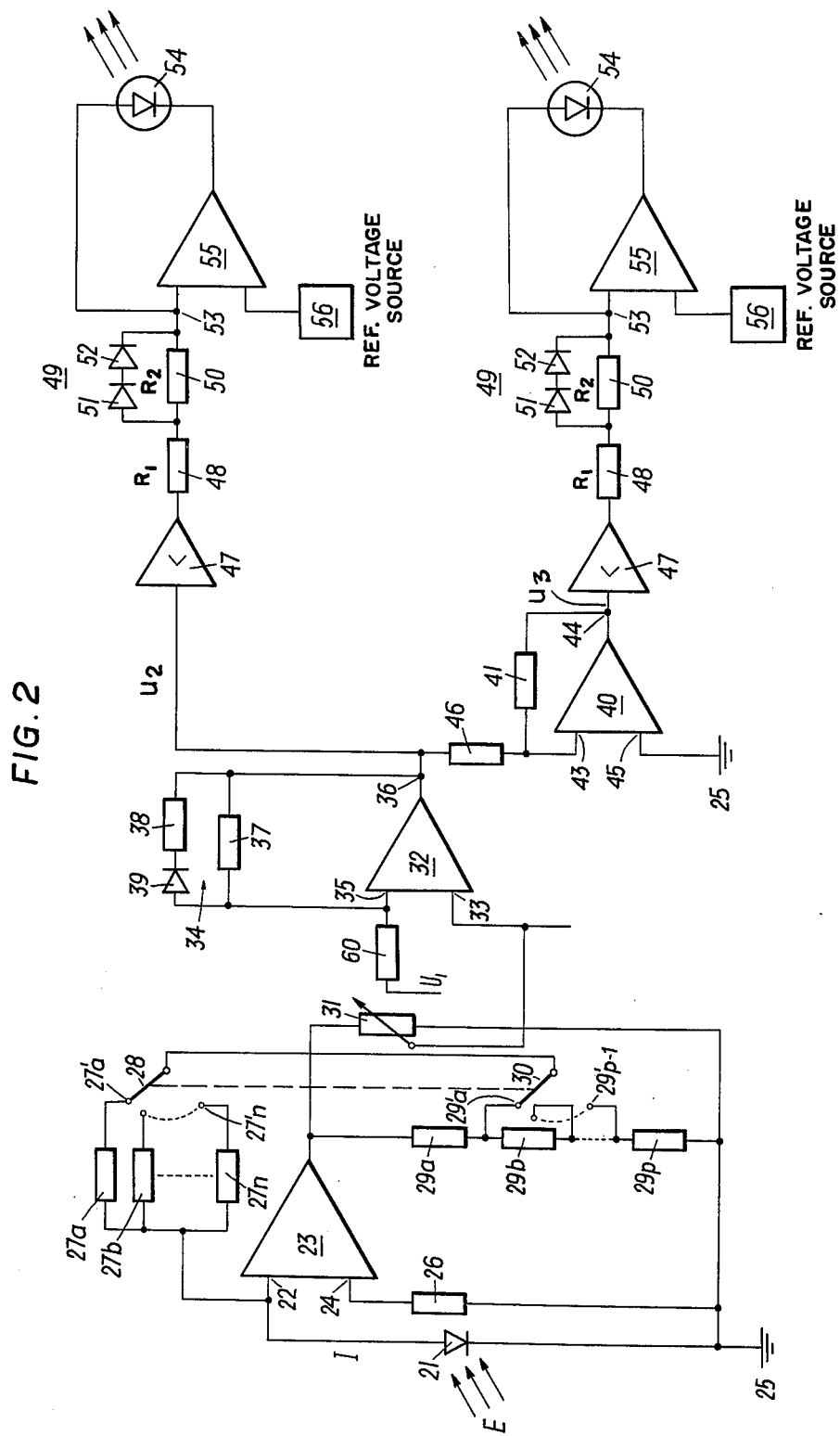

According to FIG. 2, photosensitive diode 21 is connected by short circuit to the inverting input 22 of a current-voltage converter 23, which advantageously is an operation amplifier, whereby its input current I is a standard for the impinging light intensity E. The second input 24 is connected via a resistor 26 to ground 25 of the instrument. Correction member 6 of FIG. 1 comprises a parallel arrangement of a plurality of resistors 27a, 27b to 27n, whose common connecting point is connected to input 22 of amplifier 23. A switch 28 makes possible the selective switching on of one of these resistors, corresponding to the sensitivity of the film that is being used.

The correction member 7 of FIG. 1, according to FIG. 2 consists of a group of series connected resistors 29a, 29b to 29p, introduced between the output of amplifier 23 and instrument ground 25. A second switch 30 which is in electrical connection with switch 28, makes possible the selective connection of one of resistors 27 to one of the taps of the series of resistors 29, whereby the corresponding connections of resistors 27 are designated by 27'a to 27'n and those of resistors 29 are designated by 29'a to 29'p–1. Switch 30 is in mechanical connection with the image change number setting device of a moving picture camera, which device is not illustrated.

Correction member 8 of FIG. 1 is made as a potentiometer 31 and makes possible the adjustment of the circuit as a function of the sensitivity of photosensitive element 21.

Figure 3:
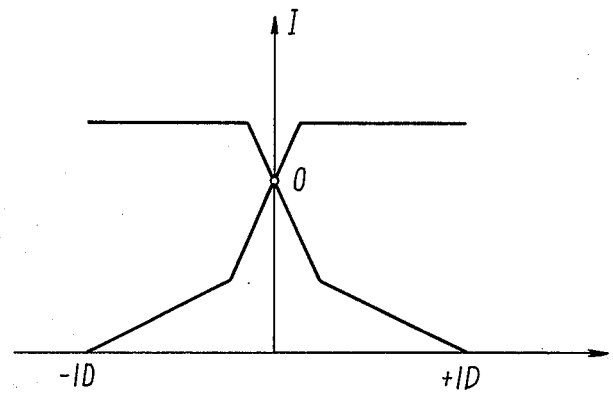

Circuit 9 of FIG. 2 is a differential amplifier 32, whose non-inverting input 33 is connected with the collector of potentiometer 31. The inverting input 35 is connected to a feedback circuit 34, which consists in the parallel connection of a resistor 37 with the series connection of a diode 39 and another resistor 38. In addition, input 35 is connected via a resistor 60 with a reference voltage source $U_1$ that is not illustrated. Feedback circuit 34 is so designed that the amplification of amplifier 32, depending upon the polarity of the input signal changes between the single and the double multiple of a given value. If the diode 39 is biased in the transmission direction, resistors 37 and 38 are connected in parallel. If on the contrary the diode is blocked, only resistor 37 is in the feedback circuit. This feedback circuit thus determines two amplification values, whereof one is twice the other. This arrangement allows correction of the nonlinearity of the curve which defines the deviation in stop values with reference to the correct illumination as a function of brightness. If for example it is assumed that a brightness of 100 lux corresponds to the correct illumination, then a brightness of 50 lux coresponds to an underexposure equal to a stop value, and a brightness of 200 lux a similar overexposure. Without this correction by circuit 34, the response of the indicator as a function of brightness would be asymmetrical (FIG. 3). From the output of circuit 9 the voltage signal is taken directly to circuit 14 on the one hand and to inverter 16 on the other.

Inverter 16 includes an operation amplifier 40 with a feedback circuit resistor 41 between its inverting input 43 and its output 44. The second input 45 of operation amplifier 40 is applied to ground 25. Between the output of circuit 9 and the input 43 of amplifier 40 there is a resistor 46 which is like resistor 41.

The output of circuit 16 is connected with circuit 17 which is of the same structure as circuit 14. The elements of these circuits therefore have the same reference numerals.

Signal voltages $U_3$ and $U_2$ respectively are applied to a power amplifier 47 which is connected by a resistor 48 with circuit 49 which has a current dependent resistor. This circuit provides for means for delinearizing the current in photodiodes 54 and hence the illumination of photodiodes 54, and consists of a parallel connection of a resistor 50 and series connection of two diodes 51, 52. The resistivity of resistor 48 is designated $R_1$ and that of resistor 50 $R_2$. V is the voltage between the input of resistor 48 and the output of circuit 49 (terminal 53). $U_s$ is the threshold voltage of diodes 51, 52 and I the intensity of the current passing through circuit 49.

If the voltage at the terminals of resistor 50 is less than $U_s$, i.e. if $IR_2$ is the same as or less than $U_s$, then $V = (R_1 + R_2).I$. As soon as current intensity $I < U_s/R_2$, correspondingly $IR_2 < U_s$ we have for $V$ the equation $V = R_1 I + U_s$.

The output of circuit 49 is connected with the inverting input of an operational amplifier 55, whose other input is connected to a reference voltage source 56.

Currents $I_2$ and $I_3$ which pass through photodiodes 54, change according to two linear functions which can be represented by two straight lines of different slope. The light intensity of one or the other of the light emitting diodes 54 is directly in proportion to current $I_2$ or $I_3$ respectively and it can, as FIG. 3 shows, be represented by two straight lines with different inclination, whereby the steeper slope occurs in the zone of the state of equilibrium.

We claim:

1. In a photometric circuit for determining exposure parameters for taking a scene having a given brightness comprising a photoelectric transducer, evaluation circuit means connected to said photoelectric transducer for producing an output signal whose value is dependent upon the brightness of the scene, a first and second combining device means, each of which is connected to said evaluation circuit means for receiving said output signal, each of said first and second combining device means further connected to a reference voltage source for receiving a reference signal, said first combining device means adapted to combine said output signal and said reference signal by performing a computing operation, said second combining device means adapted to combine said output signal and said reference signal by performing an inverse computing operation, and a first and second indicator connected to said first and second combining device means such that the brightness of said first indicator is inverse to the brightness of said second indicator.

2. The circuit of claim 1 wherein said operations performed by said first combining device means and said second combining device means include addition and subtraction.

3. The circuit of claim 1 wherein said evaluation circuit means comprises at least one correction member means to adjust the value of a given parameter, wherein the brightness of said first and second indicators varies in relation to the adjusting of said correction member, and wherein equal brightness in said first and second indicators indicates a correct setting of said given parameter.

4. The circuit of claim 3 wherein said evaluation circuit means further comprises a differential amplifier, a feedback circuit connecting the output of said differential amplifier to the input of said differential amplifier, said feedback circuit comprising a resistor in parallel with a resistor and diode.

5. The circuit of claim 1 wherein said first combining device means comprises inverter means for inverting said output signal, delinearizing means connected to said inverter means and operational amplifier means for combining said inverted output signal with said reference signal.

6. The circuit of claim 5 wherein said second combining device means comprises delinearizing means and operational amplifier means for combining said output signal with said reference signal.

7. The circuit of claim 6 wherein said delinearizing means comprises a non-linear resistance means.

8. The circuit of claim 7 wherein said non-linear resistance means comprises a resistor in parallel with at least one diode.

9. The circuit of claim 1 wherein said first combining device means comprises delinearizing means for increasing the indicating sensitivity in the matching range of brightness of said first and second indicators.

10. The circuit as claimed in claim 9, wherein said delinearizing means comprises a nonlinear resistance.

11. The circuit as claimed in claim 10, wherein said nonlinear resistor is formed by a resistance connected in parallel with at least one diode.

* * * * *